US012339154B2

(12) United States Patent
Fehrenbach

(10) Patent No.: US 12,339,154 B2
(45) Date of Patent: Jun. 24, 2025

(54) OPTICAL FILL LEVEL MEASURING DEVICE

(71) Applicant: VEGA Grieshaber KG, Wolfach (DE)

(72) Inventor: Dominik Fehrenbach, Rottweil (DE)

(73) Assignee: VEGA Grieshaber KG, Wolfach (DE)

( * ) Notice: Subject to any disclaimer, the term of this patent is extended or adjusted under 35 U.S.C. 154(b) by 283 days.

(21) Appl. No.: 17/999,676

(22) PCT Filed: May 29, 2020

(86) PCT No.: PCT/EP2020/065088
§ 371 (c)(1),
(2) Date: Nov. 22, 2022

(87) PCT Pub. No.: WO2021/239260
PCT Pub. Date: Dec. 2, 2021

(65) Prior Publication Data
US 2023/0228613 A1 Jul. 20, 2023

(51) Int. Cl.
G01F 23/292 (2006.01)
G01F 23/284 (2006.01)
(52) U.S. Cl.
CPC ........ *G01F 23/2928* (2013.01); *G01F 23/284* (2013.01)
(58) Field of Classification Search
CPC .................................... G01F 23/2928
USPC ....................................... 73/290 R
See application file for complete search history.

(56) References Cited

U.S. PATENT DOCUMENTS

| 2014/0360263 | A1* | 12/2014 | Fehrenbach | ........ G01F 23/2967 |
| | | | | 73/290 V |
| 2015/0077284 | A1* | 3/2015 | Tidhar | ...................... G01S 3/04 |
| | | | | 342/52 |
| 2018/0292519 | A1 | 10/2018 | Larsson | |
| 2019/0316951 | A1 | 10/2019 | McCormick | |
| 2020/0041324 | A1 | 2/2020 | Dieterle | |
| 2020/0352245 | A1* | 11/2020 | Otiaba | ................ G01F 23/2921 |
| 2020/0355537 | A1 | 11/2020 | Falger et al. | |
| 2021/0318159 | A1* | 10/2021 | Dieterle | ................ G01F 23/284 |

FOREIGN PATENT DOCUMENTS

| DE | 10 2018 102 366 A1 | 8/2019 |
| EP | 1 039 272 A2 | 9/2000 |
| EP | 3 232 168 A1 | 10/2017 |
| WO | WO 2019/115996 A1 | 6/2019 |

OTHER PUBLICATIONS

International Search Report issued Feb. 26, 2021 in PCT/EP2020/065088 filed on May 29, 2020, 3 pages.

* cited by examiner

Primary Examiner — Walter L Lindsay, Jr.
Assistant Examiner — Philip T Fadul
(74) Attorney, Agent, or Firm — Oblon, McClelland, Maier & Neustadt, L.L.P.

(57) ABSTRACT

An optical level measuring device configured to measure a fill level of a medium through the container wall of a plastic container, having an optical distance sensor as well as a radar sensor.

14 Claims, 2 Drawing Sheets

OPTICAL FILL LEVEL MEASURING DEVICE

FIELD OF THE INVENTION

The invention relates to fill level measurement. More particularly, the invention relates to an optical level measuring device configured to measure a fill level of a medium through the container wall of a plastic container, a plurality of uses of an optical distance sensor, a level measuring arrangement for measuring a fill level of a medium through the container wall of a plastic container, a method for measuring a fill level of a medium through the wall of a plastic container, a program element, and a computer readable medium.

TECHNICAL FIELD

For the level or limit detection of a medium in a container, especially for process automation in the industrial environment, non-contact level sensors are often used. These are typically level radar sensors installed in an opening of the container. These level sensors emit measuring signals in the direction of the product surface or the vessel bottom, which are then reflected by the product surface and/or the vessel bottom and received again. The fill level can be calculated from the running time of the signal from the level sensor to the product surface and back.

The attachment of the level sensor usually requires an opening in the container into which the sensor can be screwed or otherwise fastened.

SUMMARY

It is a task of the present invention to provide a level measuring device which can be used in a simple manner for different containers and which provides reliable, accurate measurement results.

This task is solved by the features of the independent patent claims. Further embodiments of the invention result from the dependent claims and the following description of embodiments.

A first aspect of the invention relates to a level measuring device, in particular an optical level measuring device, configured to measure a fill level of a medium or product through the container wall of a plastic container.

The level measuring device has an optical distance sensor configured to emit a light signal through the container wall in the direction of the product surface and to receive the light signal reflected at the product surface, also through the container wall. In other words, the optical level measuring device is configured to measure the fill level or limit level through the container wall. Thus, it does not have to be installed in an opening of the container or inside the container. In particular, the container does not require an opening.

The level measuring device has an evaluation device, which is configured to determine the fill level or the limit level of the medium in the plastic container by evaluating the received light signal (which has passed through the container wall twice, once on the outward path and once on the return path).

The level measuring device is configured especially for use with small plastic containers and process automation in industrial environments. It measures through the wall of the plastic container. In particular, it is able to clearly detect the boundary cases "container completely full" and "container completely empty".

According to an embodiment, the level measuring device has a radar sensor which is configured to transmit a radar signal through the container wall in the direction of the product surface and to receive the radar signal reflected at the product surface, also through the container wall. The evaluation device is configured to determine the fill level or limit level of the medium in the plastic container by evaluating the received radar signal and/or evaluating the received light signal.

In particular, it can be provided that the received light signal is used to interpret the measurement result of the radar sensor, i.e., for example, to verify whether the measurement has provided a correct result or to decide whether the container is completely full or completely empty.

According to a further embodiment, the evaluation device is configured to first perform the evaluation of the received radar signal and, if this evaluation is ambiguous, to perform the evaluation of the received light signal.

Such ambiguity may arise when the container is completely filled or emptied. In this case, the radar sensor detects only the bottom echo and, if necessary, an echo of the upper container wall through which the radar signal is transmitted. The optical distance sensor provides additional information, which makes it possible to decide unambiguously whether the container is empty or full.

According to another embodiment of the present disclosure, the evaluation device is configured to first perform the evaluation of the received radar signal and, only if this evaluation is ambiguous, to perform a measurement with the optical distance sensor and to perform the evaluation of the received light signal.

Hence, energy and computing power can be saved as the optical distance sensor is only activated and used under certain circumstances.

According to another embodiment, the light signal of the optical distance sensor is a laser signal.

According to a further embodiment, the optical level measuring device has a housing in which both the optical distance sensor and the radar sensor are housed. It is therefore a coherent measuring device. The housing may, for example, be a plastic housing made of a similar material to the plastic container.

According to another embodiment, the optical level measuring device has a radio communication interface (wireless interface) configured to transmit the measured value and/or other data to an external computing unit, for example a cloud or a mobile user device, such as a smartphone. The wireless communication interface may be the only interface for external communication. However, a wired or another radio communication interface may also be provided in addition, for example to use a different transmission protocol.

According to another embodiment, the optical level measuring device is configured as a stand-alone level measuring device, without external power supply.

According to another embodiment, the optical level measuring device is configured to be glued to the outside of the plastic container, for example by means of an adhesive film or a magnetic connection. In the latter case, a magnetic plate may be bonded to the outside of the plastic container.

Another aspect of the present disclosure relates to the use of an optical distance sensor to interpret the measurement result of a radar sensor.

Another aspect of the present disclosure relates to the use of an optical distance sensor in a fill level radar measuring device.

Another aspect of the present disclosure relates to a fill level measuring arrangement for measuring a fill level of a medium through the container wall of a plastic container. The level measuring arrangement comprises an optical level measuring device described above and below, comprising an optical distance sensor, and an evaluation device described above and below, configured to determine a fill level or to detect a limit level of the medium in the plastic container by evaluating the received light signal of the optical level measuring device. In addition, the level measuring arrangement has a plastic container to the outside of which the optical level measuring device is attached Another aspect of the present disclosure relates to a method of measuring a fill level of a medium through the container wall of a plastic container, in which a light signal is first transmitted through the container wall in the direction of the product surface or the container bottom and the reflected light signal is received again. It has thus passed through the vessel wall twice. The fill level or the limit level of the medium in the plastic container is then determined by evaluating the received light signal. In particular, the received light signal can be used to decide whether the container is completely full or completely empty.

Another aspect of the present disclosure relates to a program element which, when executed on an evaluation device of a level measurement arrangement, instructs the level measurement arrangement to perform the method steps described above and below.

Another aspect of the present disclosure relates to a computer-readable medium on which a program element described above is stored.

The term "process automation in the industrial environment" can be understood as a subfield of technology that includes measures for the operation of machines and plants without the involvement of humans. One goal of process automation is to automate the interaction of individual components of a plant in the chemical, food, pharmaceutical, petroleum, paper, cement, shipping or mining industries. A wide range of sensors can be used for this purpose, which are adapted in particular to the specific requirements of the process industry, such as mechanical stability, insensitivity to contamination, extreme temperatures and extreme pressures. Measured values from these sensors are usually transmitted to a control room, where process parameters such as fill level, limit level, flow rate, pressure or density can be monitored and settings for the entire plant can be changed manually or automatically.

One subfield of process automation in the industrial environment concerns logistics automation. In the field of logistics automation, distance and angle sensors are used to automate processes inside or outside a building or within a single logistics facility.

Typical applications include systems for logistics automation in the area of baggage and freight handling at airports, in the area of traffic monitoring (toll systems), in retail, parcel distribution or also in the area of building security (access control). Common to the examples listed above is that presence detection in combination with precise measurement of the size and location of an object is required by the respective application side. Sensors based on optical measurement methods using lasers, LEDs, 2D cameras or 3D cameras that measure distances according to the time-of-flight (ToF) principle can be used for this purpose.

Another subfield of process automation in the industrial environment concerns factory/production automation. Use cases for this can be found in a wide variety of industries such as automotive manufacturing, food production, the pharmaceutical industry or generally in the field of packaging. The goal of factory automation is to automate the production of goods by machines, production lines and/or robots, i.e. to let it run without the involvement of humans. The sensors used in this process and the specific requirements with regard to measuring accuracy when detecting the position and size of an object are comparable to those in the previous example of logistics automation.

In the following, embodiments of the present disclosure are described with reference to the figures. If the same reference signs are used in the following description of figures, these designate the same or similar elements. The illustrations in the figures are schematic and not to scale.

DETAILED DESCRIPTION OF EMBODIMENTS

Figure 1:
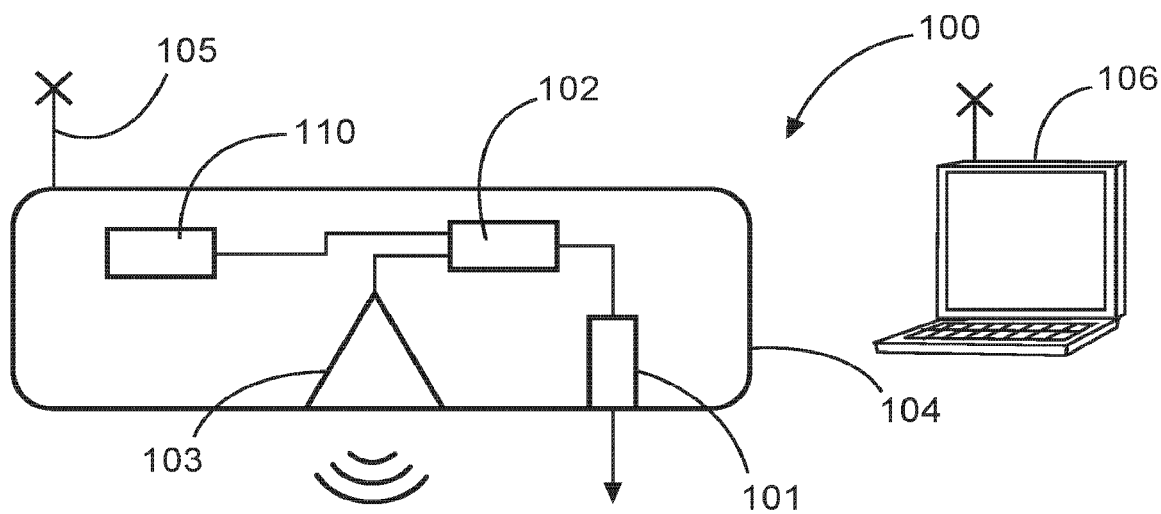
FIG. 1 shows an optical level measuring device according to an embodiment.

FIG. 1 shows an optical level measuring device 100 which can determine the fill level or limit level of a medium in a plastic container from the outside by transmitting the radar signal from the radar sensor 103 and the light signal from the optical distance sensor 101 through the wall of the plastic container, reflecting off the medium, and then passing back through the wall into the measuring device where they are detected.

The optical distance sensor 101 and the radar sensor 103 are located within the same housing 104, for example a plastic housing. They are both connected to the evaluation device 102. The electronics within the measuring device are powered by the energy storage 110.

A radio communication interface 105 is provided, via which measurement data can be transmitted to the external device 106. It may be provided that the external device 106 sends parameterization data or control data to the measuring device 100. The external device 106 may be an external control unit, a mobile device such as a smartphone, or a cloud-based system.

The self-contained radar sensor 103 measures through the wall of the plastic container, and the measuring device can transmit the obtained measurement value to the cloud. Especially for low containers, typically with a container height of less than 1 m and a small DK value of the medium, such as oil, the effect can occur that the obtained echo curves of the radar measurement do not result in a clear fill level.

Depending on the constellation, the case may arise that it is no longer possible to distinguish between the state "container completely empty" and "container completely full". In addition to the radar sensor 103, an optical distance sensor 101, for example a laser distance meter, is integrated in the level measuring device 100. This optical distance sensor also measures through the plastic container. This is possible because the plastic container is, for example, a semi-transparent IBC container made of HDPE material. The measurement result of the optical distance sensor 101 may be distorted by the container wall; however, the fill level is detected with sufficient accuracy to obtain an unambiguous measurement result in combination with the radar measurement.

The optical level measuring device 100 is mounted on an IBC container, for example. This can be seen in FIGS. 2A, 2B and 2C. Here, the level measuring device 100 measures through the container wall. Both the light signal from the distance sensor and the radar signal from the radar sensor are reflected from the product surface 202 of the product 201 and received back into the level measuring device.

Figure 2A:
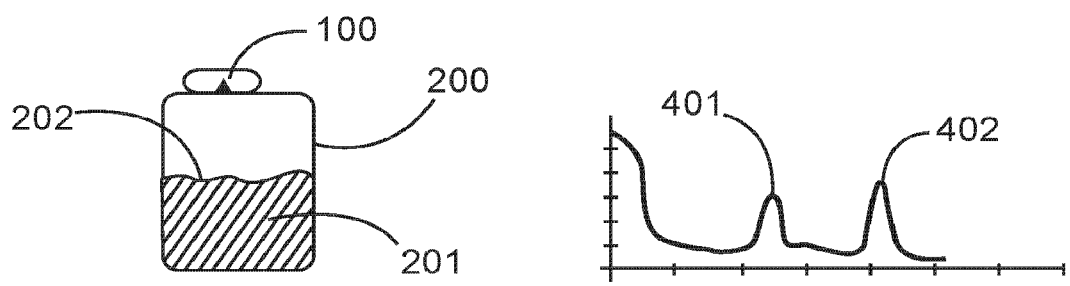
FIG. 2A, FIG. 2B and FIG. 2C show three measurement curves at different fill levels.

FIG. 2A shows the case of an approximately half-filled container 200. Two peaks 401, 402 are found in the echo curve detected by the radar sensor. Peak 401 corresponds to the reflection at the product surface 202 and peak 402 corresponds to the reflection of the radar signal at the container bottom.

Thus, both the level echo and the bottom echo are recognizable in the echo curve.

Figure 2B:
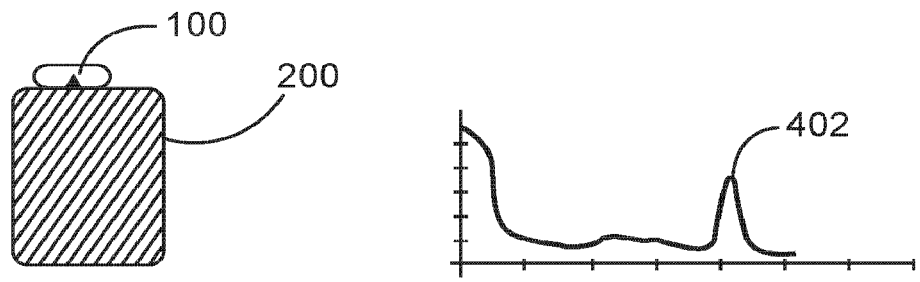
Figure 2C:
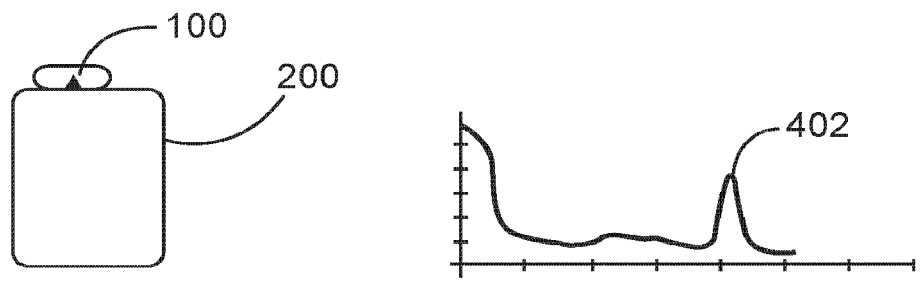

However, the radar measurement cannot distinguish between minimum and maximum fill level. These two cases are shown in FIG. 2B (maximum fill level) and 2C (minimum fill level). In both cases, only the peak 402 of the bottom echo can be detected in the echo curve detected by the radar sensor.

If the measuring signal of the optical distance sensor is now additionally evaluated, the uniqueness can be restored. Although the optical distance signal provides a rather inaccurate measuring signal (for example with an accuracy of ±50 mm), this is sufficient to distinguish between fill level max and fill level min.

Figure 3:
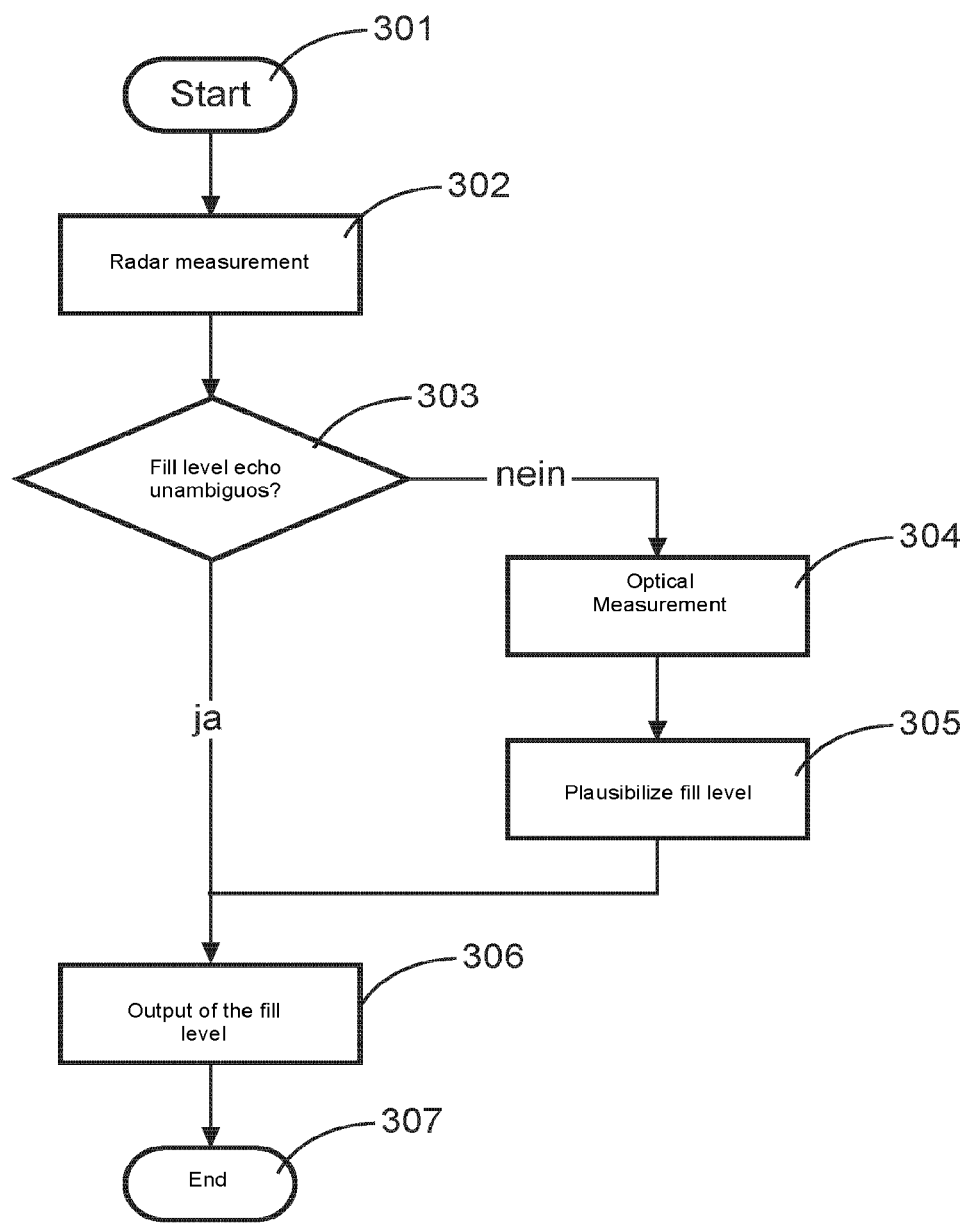
FIG. 3 shows a flow diagram of a process according to an embodiment.

FIG. 3 shows a flow diagram of a method according to an embodiment. In step 301, the method starts and in step 302, a first radar measurement is performed. In step 303, it is determined whether the radar fill level measurement has led to a clear measurement result. If this is the case, the fill level is output by the measuring device in step 306 and the procedure ends with step 307. If this is not the case, however, an optical measurement 304 is performed by an optical distance sensor. This is used to "plausibilize" the fill level measurement or to determine whether the container is completely full or completely empty.

After this plausibility check, the fill level is output in step 306 and the procedure ends with step 307.

Additionally, it should be noted that "comprising" and "comprising" do not exclude other elements or steps, and the indefinite articles "one" or "a" do not exclude a plurality. It should further be noted that features or steps that have been described with reference to any of the above embodiments may also be used in combination with other features or steps of other embodiments described above. Reference signs in the claims are not to be regarded as limitations.

The invention claimed is:

1. An optical level measuring device configured to measure a fill level of a medium through a container wall of a plastic container, comprising:
    optical distance sensor circuitry configured to emit a light signal through the container wall in a direction of a product surface and to receive the light signal reflected at the product surface, also through the container wall;
    evaluation circuitry configured to determine a fill level or to detect a limit level of the medium in the plastic container by evaluating the received light signal; and
    a radar sensor configured to emit a radar signal through the container wall in the direction of the product surface and to receive the radar signal reflected at the product surface, also through the container wall,
    wherein the evaluation circuitry is configured to determine the fill level or limit level of the medium in the plastic container by evaluating the received radar signal, and
    wherein the evaluation circuitry is configured to first perform the evaluation of the received radar signal and, when this evaluation is ambiguous, to perform the evaluation of the received light signal.

2. The optical level measuring device according to claim 1,
    wherein the evaluation circuitry is configured to first perform evaluation of a received radar signal and, when this evaluation is ambiguous, to perform the evaluation of the received light signal.

3. The optical level measuring device according to claim 2,
    wherein the evaluation circuitry is configured to first perform the evaluation of a received radar signal and, only when this evaluation is ambiguous, to perform a measurement with the optical distance sensor circuitry and to perform the evaluation of the received light signal.

4. The optical level measuring device according to claim 2,
    wherein the light signal is a laser signal.

5. The optical level measuring device according to claim 2, further comprising:
    a housing in which the optical distance sensor circuitry and a radar sensor are disposed.

6. The optical level measuring device according to claim 1,
    wherein the evaluation circuitry is configured to first perform evaluation of a received radar signal and, only when this evaluation is ambiguous, to perform a measurement with the optical distance sensor circuitry and to perform the evaluation of the received light signal.

7. The optical level measuring device according to claim 1,
    wherein the light signal is a laser signal.

8. The optical level measuring device according to claim 1, further comprising:
    a housing in which the optical distance sensor circuitry and a radar sensor are disposed.

9. The optical level measuring device according to claim 1, further comprising:
    a radio communication interface arranged to transmit the measured value to an external computing unit.

10. The optical level measuring device according to claim 1, configured as a stand-alone level measuring device, without external power supply.

11. The optical level measuring device according to claim 1, configured to be adhered to the outside of the plastic container.

12. A fill level measuring arrangement for measuring a fill level of a medium through a container wall of a plastic container, comprising:
    an optical level measuring device with an optical distance sensor, configured to emit a light signal through the container wall in a direction of a product surface and to receive the light signal reflected at the product surface, also through the container wall;
    evaluation circuitry configured to determine a fill level or to detect a limit level of the medium in the plastic container by evaluating the received light signal;
    a radar sensor configured to emit a radar signal through the container wall in the direction of the product surface and to receive the radar signal reflected at the product surface, also through the container wall, wherein the evaluation circuitry is configured to determine the fill level or limit level of the medium in the plastic container by evaluating the received radar signal, and wherein the evaluation circuitry is configured to first perform the evaluation of the received radar signal and, when this evaluation is ambiguous, to perform the evaluation of the received light signal; and a plastic container having the optical level measuring device attached to the outside thereof.

13. A method of measuring a fill level of a medium through a container wall of a plastic container using an optical level measuring device, comprising:

emitting a light signal through the container wall in a direction of a product surface and receiving the light signal reflected at the product surface, also through the container wall; and determining a fill level or detecting a limit level of the medium in the plastic container by evaluating the received light signal, wherein the optical level measuring device is configured to measure a fill level of a medium through a container wall of a plastic container and includes:

optical distance sensor circuitry configured to emit a light signal through the container wall in a direction of a product surface and to receive the light signal reflected at the product surface, also through the container wall, evaluation circuitry configured to determine a fill level or to detect a limit level of the medium in the plastic container by evaluating the received light signal, and a radar sensor configured to emit a radar signal through the container wall in the direction of the product surface and to receive the radar signal reflected at the product surface, also through the container wall, wherein the evaluation circuitry is configured to determine the fill level or limit level of the medium in the plastic container by evaluating the received radar signal, and wherein the evaluation circuitry is configured to first perform the evaluation of the received radar signal and, when this evaluation is ambiguous, to perform the evaluation of the received light signal.

14. A non-transitory computer readable medium having stored thereon a program element which, when executed on evaluation circuitry of a level measuring device for measuring a fill level of a medium through a container wall of a plastic container, instructs the fill level measuring device to implement a method of measuring the fill level of the medium through the container wall of the plastic container, comprising:

emitting a light signal through the container wall in a direction of a product surface and receiving the light signal reflected at the product surface, also through the container wall; and determining a fill level or detecting a limit level of the medium in the plastic container by evaluating the received light signal, wherein the level measuring device is configured to measure a fill level of a medium through a container wall of a plastic container and includes:

optical distance sensor circuitry configured to emit a light signal through the container wall in a direction of a product surface and to receive the light signal reflected at the product surface, also through the container wall, evaluation circuitry configured to determine a fill level or to detect a limit level of the medium in the plastic container by evaluating the received light signal, and a radar sensor configured to emit a radar signal through the container wall in the direction of the product surface and to receive the radar signal reflected at the product surface, also through the container wall, wherein the evaluation circuitry is configured to determine the fill level or limit level of the medium in the plastic container by evaluating the received radar signal, and wherein the evaluation circuitry is configured to first perform the evaluation of the received radar signal and, when this evaluation is ambiguous, to perform the evaluation of the received light signal.

* * * * *